United States Patent
Arima

(10) Patent No.: US 10,434,971 B2
(45) Date of Patent: Oct. 8, 2019

(54) CURTAIN AIR-BAG DEVICE

(71) Applicant: Autoliv Development AB, Vårgårda (SE)

(72) Inventor: Takashi Arima, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 88 days.

(21) Appl. No.: 15/523,253

(22) PCT Filed: Sep. 28, 2015

(86) PCT No.: PCT/JP2015/077248
§ 371 (c)(1),
(2) Date: Apr. 28, 2017

(87) PCT Pub. No.: WO2016/067796
PCT Pub. Date: May 6, 2019

(65) Prior Publication Data
US 2017/0327073 A1    Nov. 16, 2017

(30) Foreign Application Priority Data

Oct. 29, 2014  (JP) ................................. 2014-219848

(51) Int. Cl.
*B60R 21/232* (2011.01)
*B60R 21/213* (2011.01)
(Continued)

(52) U.S. Cl.
CPC .......... *B60R 21/232* (2013.01); *B60R 21/213* (2013.01); *B60R 21/237* (2013.01);
(Continued)

(58) Field of Classification Search
CPC ................ B60R 21/232; B60R 21/213; B60R 2021/23386; B60R 21/2338
(Continued)

(56) References Cited

U.S. PATENT DOCUMENTS 6,176,515 B1 *  1/2001  Wallner ................ B60R 21/232
                                                  280/729
6,237,939 B1 *  5/2001  Resh ..................... B60R 21/213
                                                  280/730.2
(Continued)

FOREIGN PATENT DOCUMENTS

JP    2004-090662 A    3/2004
JP    2004-256000 A    9/2004
(Continued)

OTHER PUBLICATIONS

Inomata et al. JP 2004-256000 A , English machine translation, ip.com. (Year: 2004).*

(Continued)

*Primary Examiner* — Karen Beck
(74) *Attorney, Agent, or Firm* — Brinks Gilson & Lione

(57) ABSTRACT

A curtain airbag device capable of preventing a cushion from damaging a front pillar trim or being caught by the front pillar trim upon deployed. A cushion 102 of a curtain airbag device 100 is inflated and deployed at a side wall of a vehicle interior to restrain an occupant. The curtain airbag device 100 includes: a cushion 102 having a bag shape and inflated and deployed on the vehicle front side of a passenger seat; and a first strap 148. The first strap 148 has one end 156 attached to a front pillar 104 and the other end 162 attached on the vehicle inner side of the cushion 102 in an elongate stored form. The first strap 148 moves to the vehicle inner side and is strained by inflation and deployment of the cushion 102 pushing out a front pillar trim 184 that covers the front pillar 104 to the vehicle inner side.

9 Claims, 8 Drawing Sheets

(51) Int. Cl.
  *B60R 21/2338* (2011.01)
  *B60R 21/237* (2006.01)
  *B60R 21/261* (2011.01)

(52) U.S. Cl.
  CPC ........ *B60R 21/2338* (2013.01); *B60R 21/261* (2013.01); *B60R 2021/23386* (2013.01); *B60R 2021/2612* (2013.01)

(58) Field of Classification Search
  USPC .................................. 280/730.2, 743.2, 749
  See application file for complete search history.

(56) References Cited

U.S. PATENT DOCUMENTS

| | | | | |
|---|---|---|---|---|
| 6,273,456 | B1 * | 8/2001 | Heigl | B60R 21/232 |
| | | | | 280/728.1 |
| 6,505,853 | B2 * | 1/2003 | Brannon | B60R 21/232 |
| | | | | 280/729 |
| 6,676,154 | B2 * | 1/2004 | Fischer | B60R 21/232 |
| | | | | 280/729 |
| 7,762,578 | B2 * | 7/2010 | Dix | B60R 21/232 |
| | | | | 280/730.2 |
| 7,823,922 | B2 * | 11/2010 | Mitchell | B60R 21/232 |
| | | | | 280/730.2 |
| 8,282,124 | B2 * | 10/2012 | Trovato | B60R 21/232 |
| | | | | 280/730.2 |
| 8,439,397 | B1 * | 5/2013 | Steinbrecher | B60R 21/232 |
| | | | | 280/730.2 |
| 9,764,711 | B2 * | 9/2017 | Narita | B62D 25/10 |
| 2003/0001364 | A1 * | 1/2003 | Welch | B60R 21/21 |
| | | | | 280/730.2 |
| 2008/0106072 | A1 * | 5/2008 | Walston | B60R 21/08 |
| | | | | 280/728.1 |
| 2008/0179865 | A1 * | 7/2008 | Valdez | B60R 21/232 |
| | | | | 280/730.2 |
| 2010/0013203 | A1 * | 1/2010 | Mitchell | B60R 21/232 |
| | | | | 280/743.2 |
| 2015/0151708 | A1 * | 6/2015 | Kawamura | B60R 21/232 |
| | | | | 280/728.2 |
| 2018/0208146 | A1 * | 7/2018 | Azuma | B60R 21/232 |

FOREIGN PATENT DOCUMENTS

| | | | |
|---|---|---|---|
| JP | 4122195 | B2 | 7/2008 |
| JP | 2014-177164 | A | 9/2014 |
| JP | 2016124497 | A * | 7/2016 |
| JP | 2016124498 | A * | 7/2016 |
| JP | 6116947 | B2 * | 4/2017 |
| WO | WO-2012144404 | A1 * | 10/2012 ........... B60R 21/232 |
| WO | WO-2016067796 | A1 * | 5/2016 ........... B60R 21/213 |

OTHER PUBLICATIONS

Azuma et al. JP2016/124497 A, English Machine translation ip.com (Year: 2016).*
Japan Patent Office, 3-4-3, Kasumigaseki, Chiyoda-ku, Tokyo 100-8915, Japan, International Search Report for International Application No. PCT/JP2015/077248, dated Dec. 8, 2015, 2 pgs., Form PCT/ISA/2010.

* cited by examiner

CURTAIN AIR-BAG DEVICE

CROSS REFERENCE TO RELATED APPLICATIONS

This application is a 35 U.S.C. § 371 national phase application of International Application No. PCT/JP2015/077248, filed Sep. 28, 2015, which claims the benefit of priority under 35 U.S.C. § 119 to Japanese Patent Application No. 2014-219848, filed Oct. 29, 2014, the contents of which are incorporated herein by reference in their entirety.

FIELD OF THE INVENTION

The present invention relates to a curtain airbag device inflated and deployed in a curtain form at a side surface of a vehicle interior in order to restrain an occupant.

BACKGROUND

In recent years, curtain airbag devices have become standard equipment for most vehicles as disclosed in Japanese Patent No. 4122195. As described by the previously mentioned reference the curtain airbag device includes a cushion inflated and deployed along a side window at the side surface of a vehicle interior in an emergency event, and the cushion protects an occupant against a side collision and a subsequent roll over (turn over).

SUMMARY OF INVENTION

The cushion of the curtain airbag device is attached, at its upper end, to a front pillar of the vehicle and a roof side rail continuous with the front pillar by a fastener such as a bolt. In a normal state, the cushion is folded or rolled up in an elongate form and stored between the front pillar and the roof side rail of the vehicle and a front pillar trim and a roof side trim as interior members for covering these components.

The front pillar trim is typically fixed to a front pillar by a clipper joint (also referred to as a snap attachment joint). The front pillar trim is pushed out by an inflated cushion in an emergency event and detached from the front pillar as its coupling to the front pillar by the clipper joint is released. However, the front pillar trim can be suitably released from the coupling by means of the clipper joint on the vehicle inner side (on the inner side in the vehicle widthwise direction) but the cushion pushes out the front pillar trim in the direction in which the cushion is inflated and deployed, i.e. in the downward direction.

The front pillar trim is pushed out in the downward direction which is substantially 90° shifted from the vehicle inner side that allows easier detachment thereof. Therefore, when the cushion starts to be inflated and deployed, the front pillar trim is not detached from the front pillar in some cases, the front pillar trim is partly cracked by the inflated cushion or the cushion is caught by the front pillar trim which prevents the cushion from being inflated and deployed in other cases.

In particular, it has been a problem to be solved in the field in recent years to protect an occupant upon a so-called oblique collision in which the occupant moves obliquely forward as the vehicle receives an impact obliquely from the front. To this end, an additional chamber is provided at the front end of the curtain airbag, and the volume of the part of the cushion stored between the front pillar and the front pillar trim tends to increase as a result. However, the space between the front pillar and the front pillar trim cannot be increased corresponding to the increased volume of the cushion, and the cushion is stored in the space with little spatial allowance. In this state, the cushion is more likely to press the front pillar trim excessively during inflation and deployment, and the case of hindrance to the inflation and deployment as described above has more frequently occurred.

In order to solve these problems, a tape is attached to the front pillar trim to prevent the front pillar trim from being cracked or the specification of the cushion is changed so that the cushion is not caught by the front pillar trim. However, these measures could not be exactly fundamental solutions to the problems.

The present invention is in view of the problems, and it is an object of the present invention to provide a curtain airbag device capable of preventing the front pillar trim from being damaged by the cushion or the cushion from being caught by the front pillar trim when the cushion is inflated and deployed.

SUMMARY AND INTRODUCTORY DESCRIPTION OF THE INVENTION

In order to solve the problems, a curtain airbag device according to the present invention includes: a cushion having a bag shape and rolled up or folded into an elongate stored form, and moreover stored along a front pillar and a roof side rail that form an upper part of a vehicle side wall; and an inflator configured to supply the cushion with gas for inflation and deployment, the device further includes a long first strap, the first strap has one end attached to the front pillar and the other end attached on a vehicle inner side of the cushion in the stored form, and the first strap moves to the vehicle inner side and is strained by inflation and deployment of the cushion thereby pushing out a front pillar trim that covers the front pillar to the vehicle inner side.

According to the present invention, the first strap moving to the vehicle inner side and strained by inflation and deployment of the cushion can push out the front pillar trim to the vehicle inner side. Since a direction toward the vehicle inner side is most suitably for detaching the front pillar trim from the front pillar, the front pillar trim can surely be removed from the front pillar. Therefore, according to the present invention, the problems can be solved, in other words, the partial cracking of the front pillar trim that could otherwise be caused by the inflated cushion pushing out the front pillar trim in an inappropriate direction can be prevented, the cushion is not caught by the front pillar trim and the inflation and deployment of the cushion is not hindered.

In particular, according to the present invention, even when the cushion is stored between the front pillar and the front pillar trim with little spatial allowance, the front pillar trim is smoothly detached without being caught by the cushion. In this way, the cushion is not caught by the front pillar trim and the inflation and deployment of the cushion is not hindered. Therefore, the cushion can smoothly be inflated and deployed.

The other end of the first strap may be attached to a part of the cushion that continues to be positioned on a surface of the cushion on the vehicle inner side until the cushion is inflated and deployed from the stored form. In this configuration, the first strap may surely be moved to the vehicle inner side when the cushion is inflated and deployed.

The other end of the first strap may be attached to a part of the cushion in the stored form that is stored in the roof side rail, and the entire first strap from one end to the other end may be arranged at the surface of the cushion in the stored form on the vehicle inner side. In this configuration, the entire first strap can smoothly be strained when the cushion is inflated and deployed. In this way, the front pillar trim can quickly be pushed out to the vehicle inner side.

The other end of the first strap may be attached to a region of the cushion to be initially supplied with the gas for inflation and deployment from the inflator. This is because the first strap attached to the region can move to the vehicle inner side and get strained in an initial stage of the inflation and deployment or substantially simultaneously with the start of the deployment of the cushion, and the front pillar trim can be detached from the front pillar before the other region of the cushion is inflated to contact the front pillar trim. The part of the cushion stored along the front pillar is inflated after the front pillar is removed, and therefore it is further ensured that the part does not crack the front pillar trim or is not caught by the front pillar trim.

The cushion may have a plurality of chambers and a duct positioned above the plurality of chambers to distribute the gas for inflation and deployment to the plurality of chambers, and the other end of the first strap may be attached on the duct. This is because the region initially supplied with the gas for inflation and deployment from the inflator is the duct, and the gas for inflation and deployment is distributed to the chambers from the duct.

The other end of the first strap may be attached near a center pillar. In this way, the first strap passes by way of the part to be moved most to the vehicle inner side in the vicinity of the front pillar trim in the initial stage of the inflation and deployment of the cushion. Therefore, the first strap is allowed to move significantly to the vehicle inner side and get strained with high tensile strength, so that the coupling between the front pillar and the front pillar trim can be disengaged with strong force.

The curtain airbag device may further include a second strap configured to connect a front end of the cushion in the inflated and deployed state and the front pillar, and the second strap may provide the lower part of the cushion with tension at least in a vehicle front-back direction when the cushion is inflated and deployed. The second strap is a so-called tension belt, and the tension provided by the second strap to the lower part of the cushion allows the cushion to be stably inflated and deployed.

According to the present invention, a curtain airbag device capable of preventing the cushion from damaging the front pillar trim and from being caught by the front pillar trim when the cushion is inflated and deployed.

DETAILED DESCRIPTION OF THE INVENTION

Figure 1A:
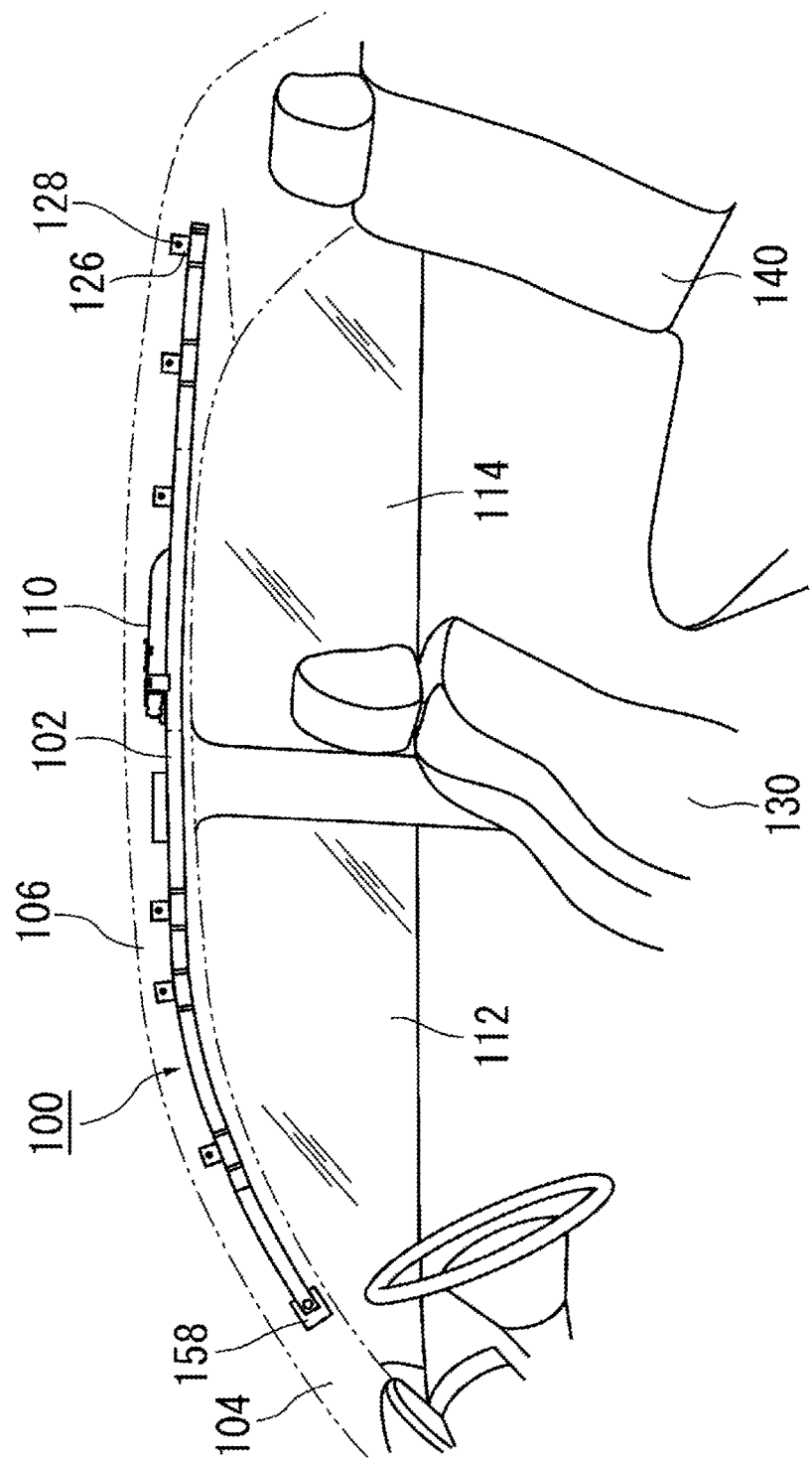
FIGS. 1(a) and (b) are exemplary views of a curtain airbag device according to an embodiment of the present invention.

Now, a preferred embodiment of the present invention will be described in conjunction with the accompanying drawings. The sizes, materials, and other specific numerical values in the following description of the embodiment are simply by way of examples for ease of understanding of the present invention and should not be construed to limit the present invention unless otherwise specified. Note that in the description and the drawings, components having substantially the same functions and configurations are designated by the same reference characters, so that their description is not repeated, while components not directly relevant to the present invention are not shown.

Figure 1B:
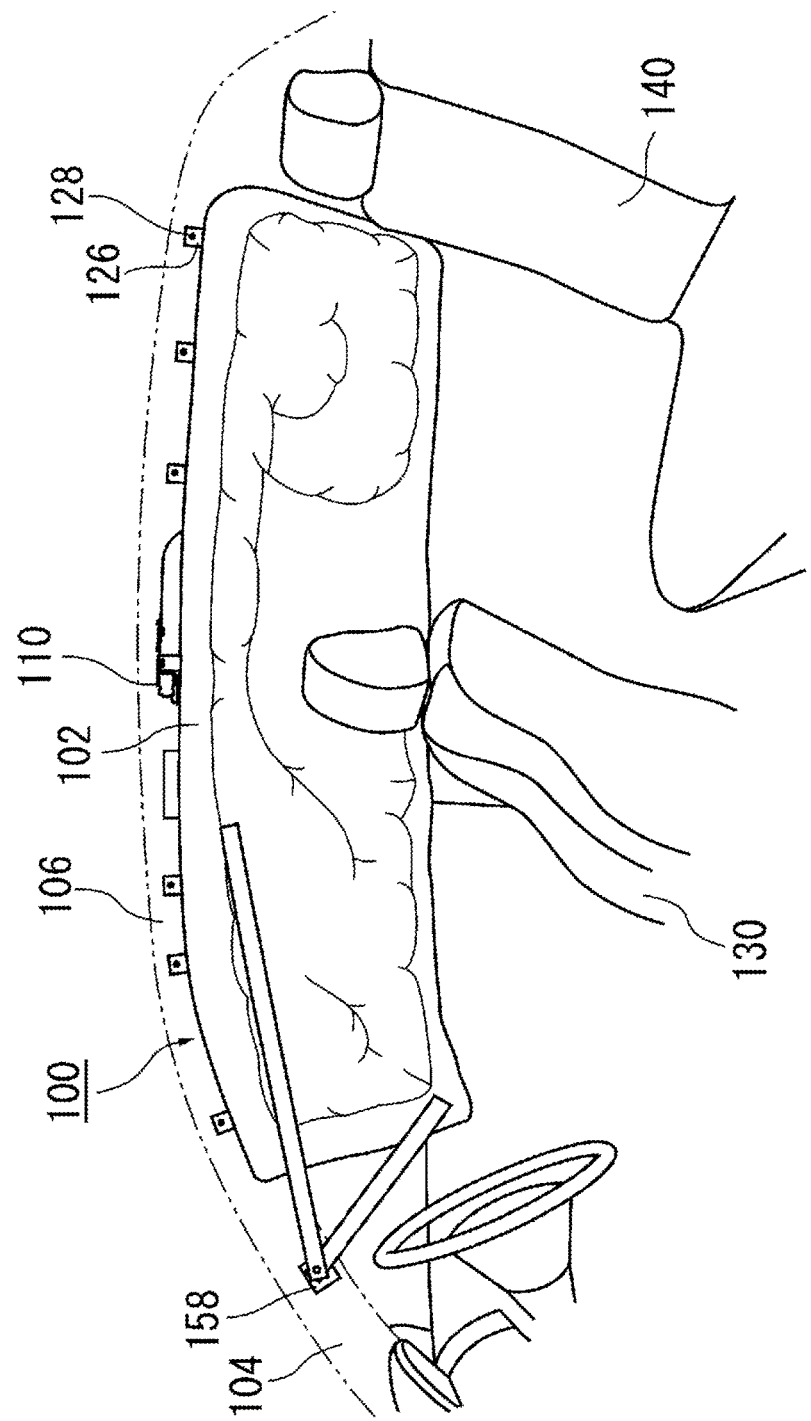

FIGS. 1(a) and (b) are exemplary views of a curtain airbag device 100 according to an embodiment of the present invention. FIG. 1(a) and FIG. 1(b) are views of a vehicle side wall from the inside of the vehicle illustrating a cushion 102 in the curtain airbag device 100 in a stored form and in an inflated and deployed states, respectively.

The cushion 102 is a part inflated and deployed in an emergency event to protect an occupant. As illustrated in FIG. 1(a), in a normal state, the cushion 102 is rolled up and stored in the state of a roll elongate in the vehicle front-back direction and attached along a front pillar 104 and a roof side rail 106 forming upper parts of the side wall of the vehicle body. The front pillar 104 and the roof side rail 106 are actually covered with a front pillar trim 184 (see FIG. 4, not shown in FIGS. 1(a) and (b) and a roof trim (not shown), respectively. Therefore, the cushion 102 is not visible from the inside of the vehicle in a normal state.

An inflator 110 as a gas generator for example in a cylindrical (tubular) shape is provided in an upper part of the cushion 102. As illustrated in FIG. 1(b), the cushion 102 is inflated by the pressure of gas supplied from the inflator 110 and restrains an occupant. Some of presently available inflators combust a gas generating agent filled therein and generate gas, some supply compressed gas filled therein without generating heat, or others include both a gas generating agent and compressed gas. Any of the above types of inflators may be used as the inflator 110.

In the state illustrated in FIG. 1(a), upon a side collision or roll over (turn over) for example, a sensor (not shown) provided in the vehicle senses the impact, in response to which a signal is transmitted to the inflator 110. The inflator 110 is activated in response to the signal, and gas is supplied to the cushion 102. As illustrated in FIG. 1(b), when supplied with the gas from the inflator 110, the cushion 102 is inflated and deployed downward along the side wall of the interior, in other words along the side windows 112 and 114 and protects an occupant.

Figure 2A:
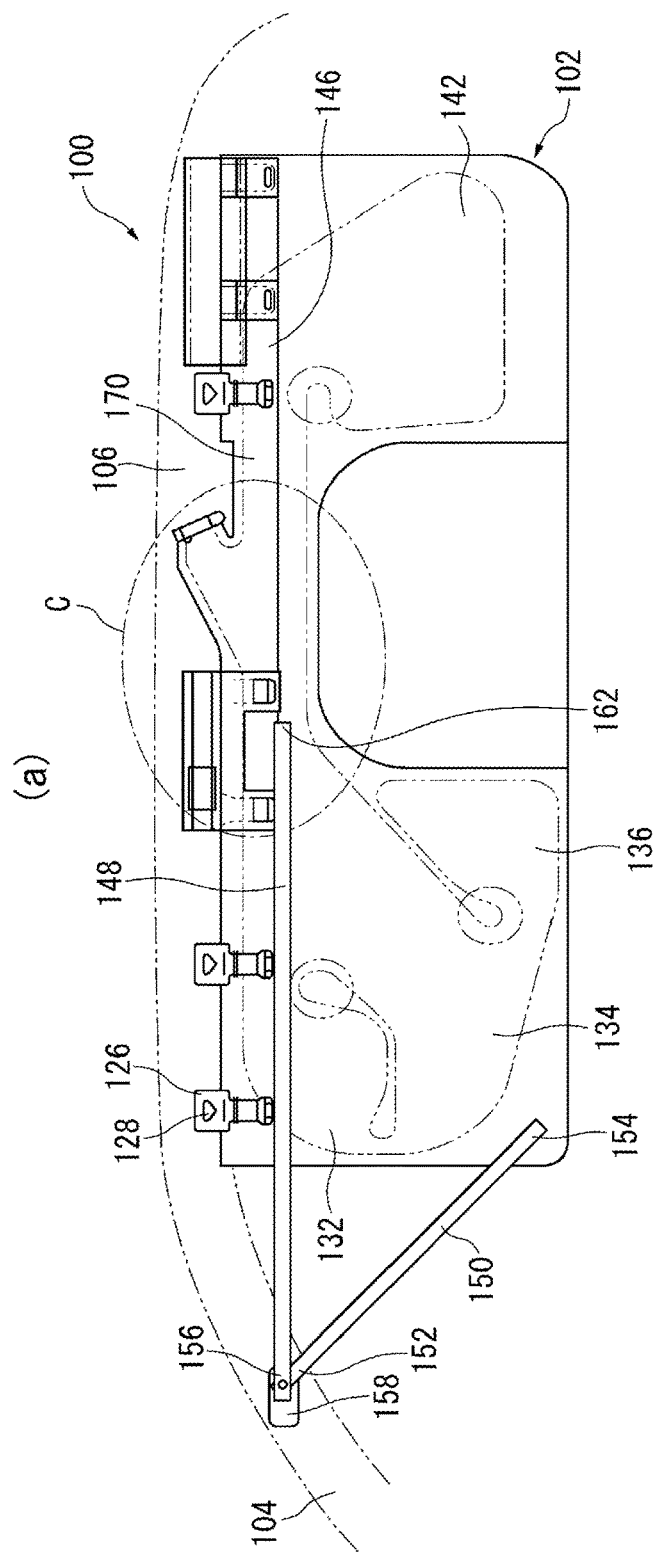
FIGS. 2(a) and (b) are exemplary views showing in detail the cushion in the deployed state with FIG. 2(b) being an enclosed view of the region designated by "C" in FIG. 2(a).
Figure 2B:
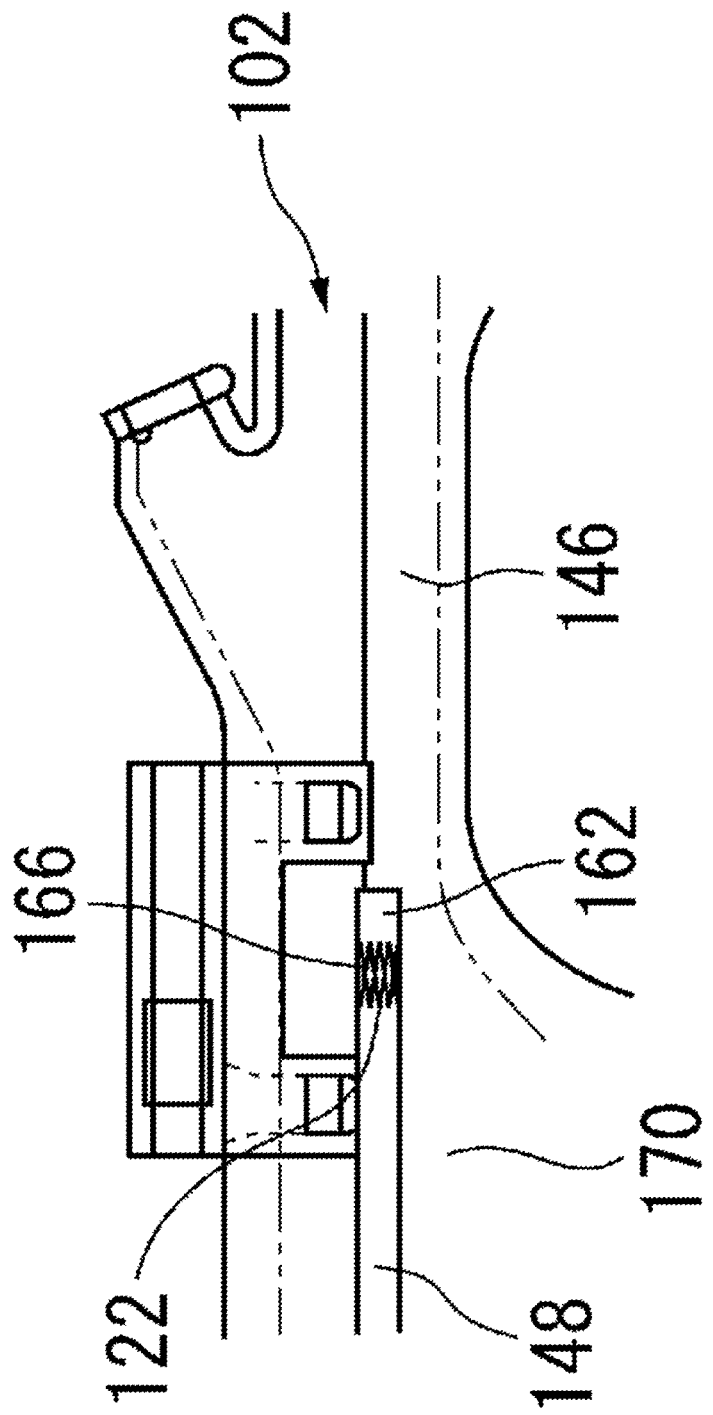

FIGS. 2(a) and (b) are views illustrating in detail the cushion 102 in the deployed state. FIG. 2(a) is a general view of the cushion 102 in the deployed state, and FIG. 2(b) is a detailed view of the area C of the cushion 102 in the deployed state in FIG. 2(a). The cushion 102 is formed into a bag shape in a so-called cut and sewn manner by sewing and/or adhering two pieces of fabric (base fabric) placed on each other as front and back sides. Note however that the cushion may be formed into a bag shape by the OPW (One-Piece Woven) method.

The upper edge of the cushion 102 is provided with a plurality of attachment tabs 126 used to attach the cushion to the vehicle. The attachment tab 126 is band-shaped and fixed to the front pillar 104 and the roof side rail 106 by a bolt 128. In this way, the cushion 102 is attached to the vehicle.

As illustrated in FIG. 2(a), the region of the cushion 102 to be inflated is partitioned into a plurality of small chambers in consideration of positions that could be contacted by the occupant. Front chambers 132, 134, and 136 adapted to receive an occupant in a front seat 130 (see FIG. 1(b)) are formed on the front side of the vehicle. A rear chamber 142 adapted to receive an occupant in a rear seat 140 is formed on the rear side of the vehicle.

A duct 146 extended in the front-back direction of the vehicle is provided above the cushion 102, in other words above the chambers 132, 134, 136, and 142. The duct 146 is adapted to efficiently distribute gas from the inflator 110 to the chambers. Therefore, when the inflator 110 is activated, gas is made to flow to the duct 146 and then distributed from the duct to the chambers 132, 134, 136, and 142.

As illustrated in FIG. 2(a), the curtain airbag device 100 includes a long first strap 148. The first strap 148 has one end 156 attached to the front pillar 104 and the other end 162 fixed to the cushion 102 as illustrated in FIG. 2(b).

A second strap 150 as a long band-shaped string having a large-width surface is provided at a front end of the cushion 102. The second strap 150 is a member adapted to connect the cushion 102 to the vehicle, more specifically to the front pillar 104. The second strap 150 has one end 152 fixed to the front pillar 104 for example by a bolt (or other fastener) that is not shown and the other end 154 fixed to a lower part of the cushion 102 on the vehicle front side by sewing and/or adhering. The presence of the second strap 150 can provide tension at the lower part of the cushion 102 at least in the vehicle front-back direction when the cushion 102 is inflated and deployed, so that the cushion 102 can be deployed in a stable manner.

A feature of the embodiment relates to the first strap 148. Now, the first strap 148 will be described in detail as following. As illustrated in FIG. 2(a), the first strap 148 is a long band-shaped string having a large width area similarly to the second strap 150 and formed using conventionally well-known materials available in the technical field of airbags. The first strap 148 and the second strap 150 may be formed using the same material or different materials. The large-width area of the first strap 148 faces the vehicle inner side, in other words the side to be contacted by an occupant during inflation and deployment.

The first strap 148 has one end 156 fixed to a strap fixing part 158 of the front pillar 104 for example by a bolt, or other fastener (not shown). Note that according to the embodiment, the end 152 of the second strap 150 on the side of the front pillar 104 is also fixed to the strap fixing part 158, but the end 152 may be fixed to the front pillar 104 in a different location from the strap fixing part 158.

As illustrated in FIG. 2(b), the other end 162 of the first strap 148 is fixed to the base fabric 170 of the cushion 102 on the vehicle inner side above the duct 146. In this way, the end 162 of the first strap 148 is positioned above or near the duct 146 of the base fabric 170 of the cushion 102 on the vehicle inner side, in other words in the region initially supplied with gas from the inflator 110, for example by a fixing point 166 provided by sewing and/or adhering.

Figure 3A:
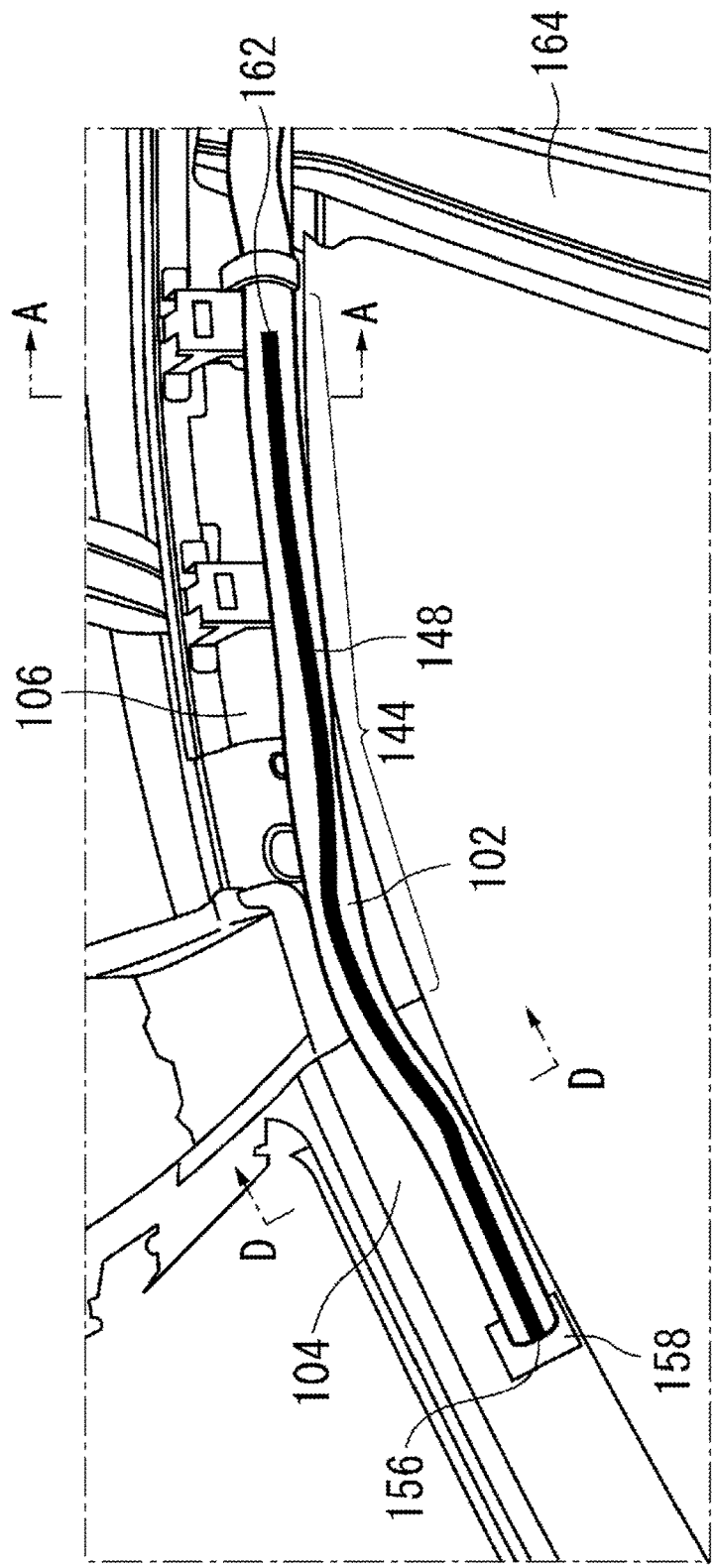
FIGS. 3(a), (b) and (c) are exemplary views of a stored form in which the cushion in FIG. 2(a) is rolled up with FIG. 3(b) being a section taken along like A-A of FIG. 3(a) and FIG. 3(c) being an enlarged view of the region designated by "B" in FIG. 3(b).
Figure 3B:
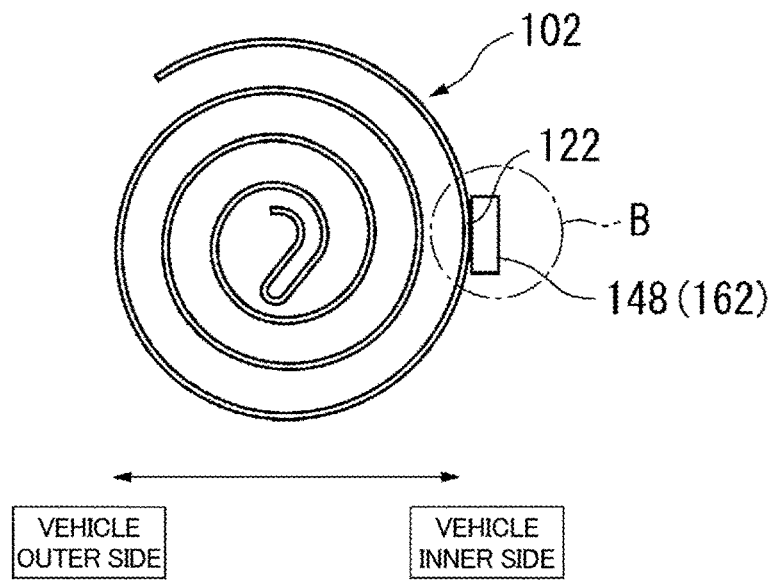

FIGS. 3(a), (b) and (c) illustrates a stored form in which the cushion in FIG. 2(a) is rolled up. FIG. 3(a) is a view of the cushion 102 in a stored form or in a rolled form as viewed from the inside of the vehicle. FIG. 3(b) is a sectional view of the rolled cushion 102 in FIG. 3(a) taken along A-A, and FIG. 3(c) is an enlarged view of the area B in FIG. 3(b).

Figure 3C:
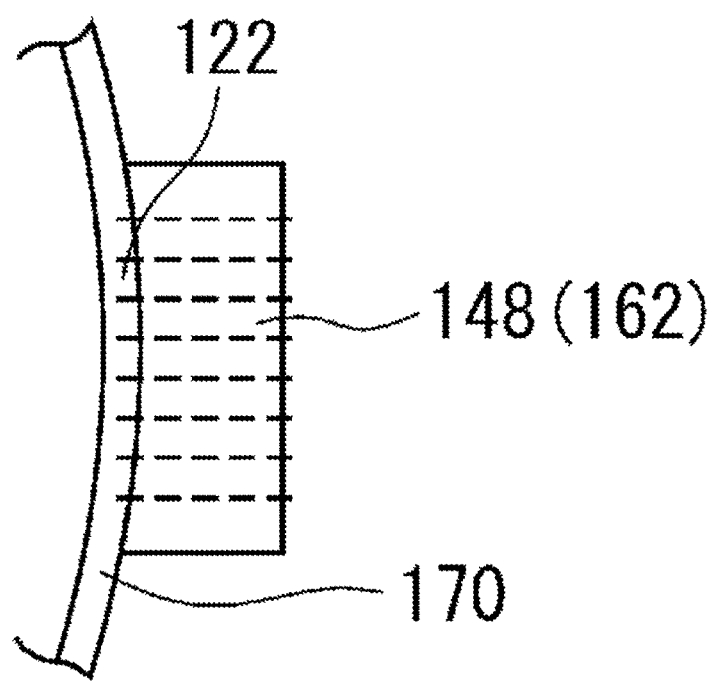

As illustrated in FIG. 3(b) and FIG. 3(c), the other end 162 of the first strap 148 is fixed to a place being the vehicle inner side by the fixing point 166 when the cushion 102 is in a stored form, in a location of the vehicle inner side base fabric 170 of the cushion 102. More specifically, as illustrated in FIG. 3(b) and FIG. 3(c) showing the cushion 102 in the stored form and in FIG. 2(b) showing the cushion 102 after deployment, the other end 162 of the first strap 148 is attached to a part 122 of the vehicle inner side base fabric 170 of the cushion 102 that continues to be positioned on the surface of the cushion 102 on the vehicle inner side until the cushion 102 is inflated and deployed from the stored form. Stated differently, the first strap 148 is not only positioned on the vehicle inner side of the cushion 102 (on the duct 146) in an inflated and deployed state as shown in FIG. 2 but also is already positioned on the vehicle innermost side of the cushion 102 while the cushion 102 is in the stored form. Therefore, if the roof trim or the front pillar trim 184 were removed, the first strap 148 would become visible from the inside of the vehicle as shown in FIG. 3(a). In this way, the other end 162 of the first strap 148 is attached to the part 122 that continues to be positioned on the surface of the cushion 102 on the vehicle inner side until the cushion is inflated and deployed from the stored form, so that the first strap 148 can always be positioned on the vehicle inner side during the inflation and deployment of the cushion. Therefore, the first strap can surely be moved to the vehicle inner side.

As illustrated in FIG. 3(a), the other end 162 of the first strap 148 is attached to a part 144 of the cushion 102 stored in the roof side rail 106 in the stored form. The entire first strap 148 from one end 156 to the other end 162 of the first strap 148 is provided on the surface of the stored cushion 102 on the vehicle inner side.

As described above, not only the other end 162 of the first strap 148 but also the entire strap from the one end 156 to the other end 162 is positioned on the vehicle innermost side of the rolled cushion 102 in the stored form. In this way, when the cushion is inflated and deployed, the entire first strap can smoothly be strained, so that the front pillar trim can be more quickly pushed out to the vehicle inner side. The cushion 102 is rolled up as in the following manner according to the embodiment in order to position the first strap in the above manner. More specifically, when the cushion 102 is rolled into a long rolled shape in the vehicle front-back direction, the lower end of the cushion 102 is lifted up to the outer side in the vehicle width-wise direction, then rolled upward from the lower side, and eventually the cushion is formed into a stored form as illustrated in FIG. 3(b). The elongated stored form of the cushion 102 may be formed by folding the cushion 102, and also in this case, the cushion 102 is folded so that not only the other end 162 of the first strap 148 but also the entire strap from the end 156 to the end 162 is positioned on the vehicle innermost side of the folded cushion 102.

Figure 4:
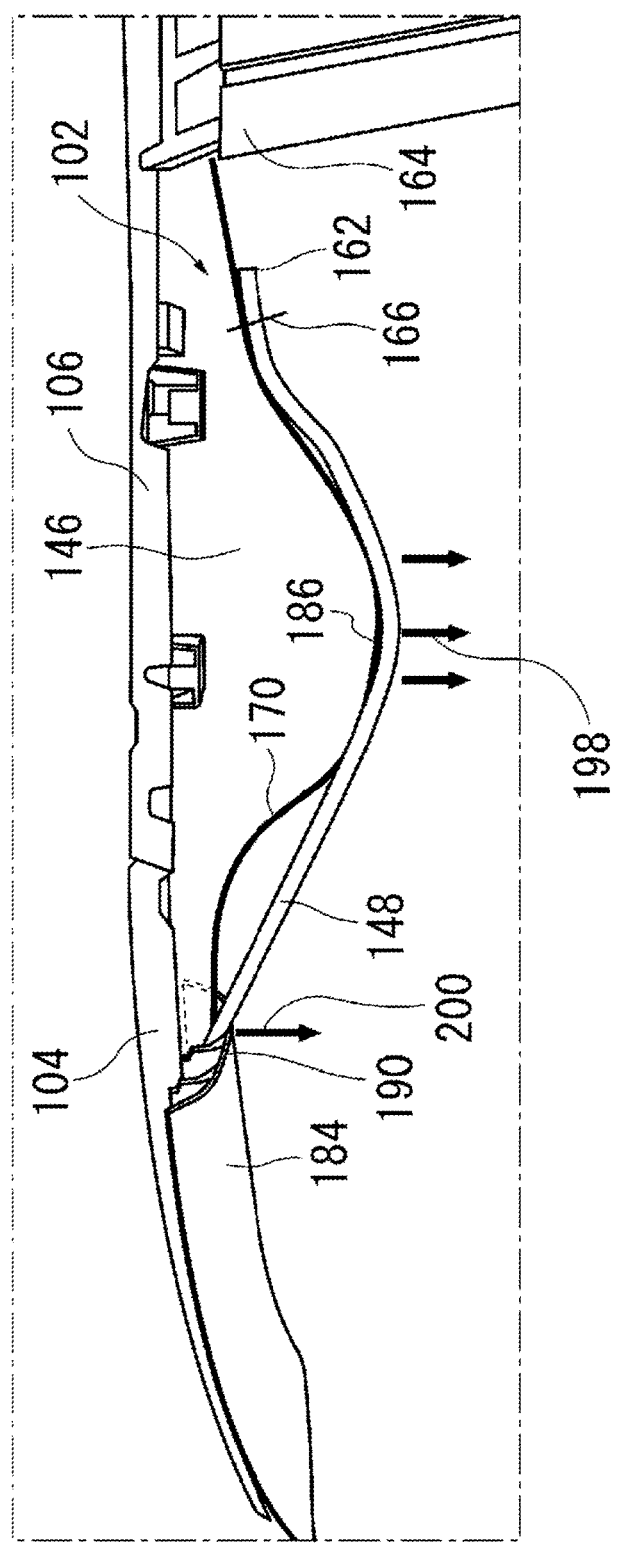
FIG. 4 is a sectional view illustrating the cushion in an initial stage of inflation and deployment.

FIG. 4 is a sectional view of the cushion 102 in FIGS. 1(a) and (b) showing the initial stage of the inflation and deployment of the cushion 102 from above the vehicle. In FIG. 4, the front pillar 104 is covered with the front pillar trim 184 as in an actual arrangement.

As illustrated in FIG. 4, the other end 162 of the first strap 148 is attached near a center pillar 164. In this configuration, the first strap 148 is passed by way of a part 186 that moves to the innermost side in the vehicle in the vicinity of the front pillar trim 184 in the initial stage of the inflation and deployment of the cushion 102. The first strap 148 passed via the part 186 can be moved significantly to the vehicle inner side and strained with high tensile strength. Therefore, the first strap 148 can push out an end 190 of the front pillar trim 184 on the side of the roof trim with greater force before gas reaches a part yet to be inflated, so that the coupling between the front pillar 104 and the front pillar trim 184 by the clip 188 can be disengaged with strong force.

Figure 5:
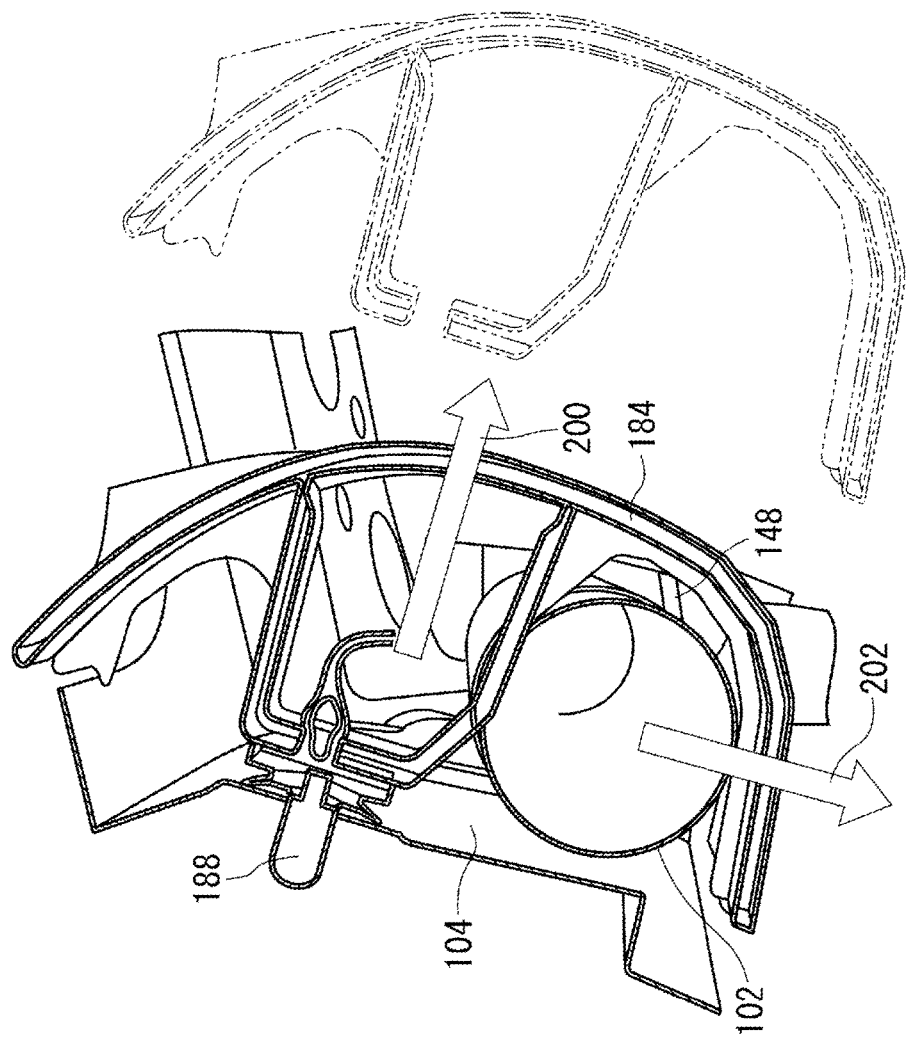
FIG. 5 is a sectional view taken along D-D in FIG. 3(a) illustrating the cushion in FIG. 4 in a stage during the inflation and deployment.

FIG. 5 is a sectional view taken along D-D in FIG. 3(a) illustrating the next stage of the inflation and deployment of the cushion 102 in FIG. 4. Also in FIG. 5, the front pillar 104 is covered with the front pillar trim 184 as in an actual arrangement. The front pillar trim 184 is fixed to the front pillar 104 by the clip 188. The state of how the cushion 102 of the curtain airbag device 100 according to the present invention is inflated and deployed will be described with reference to FIG. 4 and FIG. 5.

As illustrated in FIG. 4, in the initial stage of the inflation and deployment of the cushion 102, the duct 146 is first supplied with gas for inflation and deployment from the inflator 110 and inflated, so that the first strap 148 is strained while moving to the inner side of the vehicle as indicated by the arrow 198. As a result, as illustrated in FIG. 5, the front pillar trim 184 is pushed out to the vehicle inner side by the first strap 148 as indicated by the arrow 200. Since a direction toward the vehicle inner side is most to disengage the fixation of the front pillar trim 184 from the front pillar 104 by the clip 188, the front pillar trim 184 can surely be detached from the front pillar 104. Therefore, the other region including the chamber 134 of the cushion 102 to be inflated and deployed later than the duct 146 is deployed downward as indicated by the arrow 202 after the front pillar trim 184 is removed. More specifically, the cushion 102 does not behave to push out the front pillar trim 184 in an inappropriate direction and does not damage the front pillar trim 184 or is not caught by the front pillar trim 184.

This is particularly advantageous when the cushion 102 is stored between the front pillar 104 and the front pillar trim 184 with little spatial allowance. More specifically, when there is little spatial allowance between the front pillar 104 and the front pillar trim 184 while the cushion 102 is stored, the front pillar trim 184 would otherwise be excessively pressed by the cushion 102 and cracked easily. However, according to the embodiment, in the initial stage of the inflation and deployment of the cushion 102, the front pillar trim 184 is surely pushed out to the vehicle inner side by the first strap 148, and therefore the front pillar trim 184 is not excessively pressed. Therefore, the front pillar trim 184 is smoothly removed without being cracked or caught by the cushion 102 which is in the process of being inflated and deployed. In this way, the cushion 102 can smoothly be inflated and deployed.

In this way, according to the embodiment, it is not necessary for example to attach a tape to the front pillar trim 184 in order to prevent the front pillar trim 184 from being cracked. Change in the specification of the cushion 102 is not necessary and testing various measures to prevent components from being caught can be eliminated. In particular, according to the embodiment, the advantageous effect can be achieved by extending the first strap, in other words by a simple and inexpensive method.

Note that the first strap 148 may have any arbitrary part fixed to the cushion 102 in addition to the end 162. In this case, such an arbitrary part may be fixed by loose sewing and/or adhering as compared to the case of fixing the end 162. When the first strap 148 is fixed in an additional position in this way, the first strap 148 may be strained stably in contact with the cushion 102 when the cushion 102 is inflated and deployed.

While the described embodiment concerns an example of application of a curtain airbag device according to the present invention to an automobile, the invention may be applied to aircrafts and ships other than automobiles, and still the same advantageous effects can be provided.

While the above description constitutes the preferred embodiment of the present invention, it will be appreciated that the invention is susceptible to modification, variation and change without departing from the proper scope and fair meaning of the accompanying claims.

The invention claimed is:

1. A side curtain airbag device adapted to be stored along a front pillar of a vehicle and a roof side rail that form an upper part of a side wall of the vehicle with a front pillar trim that covers the front pillar on a vehicle inner side, and an inflator configured to supply the airbag device with a gas for inflation and deployment, comprising;
   a cushion having a bag-shape and being stored as a rolled up or folded cushion in a longitudinally elongated stored form;
   a first strap having a first end attached to the front pillar and a second end attached on a surface of the rolled up or folded cushion that, in the longitudinally elongated stored form, is an outside surface of the rolled up or folded cushion on a vehicle inner side;
   the second end of the first strap is attached to a part of the cushion that continues to be positioned on the outside surface of the cushion on the vehicle inner side until the cushion is inflated and deployed from the stored form; and
   the first strap moving to the vehicle inner side and being strained by inflation and deployment of the cushion, thereby pushing out the front pillar trim that covers the front pillar to the vehicle inner side.

2. The side curtain airbag device according to claim 1, wherein the second end of the first strap is attached to the part of the cushion in the stored form that is stored in the roof side rail, and the entire first strap from the first end to the second end is arranged at the surface of the cushion in the stored form on the vehicle inner side.

3. The side curtain airbag device according to claim 1, wherein the second end of the first strap is attached to a region of the cushion that is to be initially supplied with the gas for inflation and deployment from the inflator.

4. A side curtain airbag device adapted to be stored along a front pillar of a vehicle and a roof side rail that form an upper part of a side wall of the vehicle with a front pillar trim that covers the front pillar on a vehicle inner side, and an inflator configured to supply the airbag device with a gas for inflation and deployment, comprising;
   a cushion having a bag-shape and being stored as a rolled up or folded cushion in a longitudinally elongated stored form, the cushion having a plurality of chambers, and a duct positioned above the plurality of chambers to distribute the gas for inflation and deployment to the plurality of chambers; and
   a first strap having a first end attached to the front pillar and a second end attached on a surface of the rolled up or folded cushion that, in the longitudinally elongated stored form, is an outside surface of the rolled up or folded cushion on a vehicle inner side, and the second end of the first strap is attached on the duct;
   the first strap moving to the vehicle inner side and being strained by inflation and deployment of the cushion thereby pushing out the front pillar trim that covers the front pillar to the vehicle inner side.

5. The side curtain airbag device according to claim 1, wherein the second end of the first strap is attached adjacent to a center pillar.

6. The side curtain airbag device according to claim 1, further comprising a second strap configured to connect a front end of the cushion in the inflated and deployed state and the front pillar, wherein the second strap provides the cushion with tension at least in a vehicle front-back direction when the cushion is inflated and deployed.

7. The side curtain airbag device according to claim 6, wherein the second strap further connected to the front pillar by a fastener.

8. The side curtain airbag device according to claim 6, wherein the second strap connected to a lower portion of the front end of the cushion.

9. A side curtain airbag device adapted to be stored along a front pillar of a vehicle and a roof side rail that form an upper part of a side wall of the vehicle with a front pillar trim that covers the front pillar on a vehicle inner side, and an inflator configured to supply the airbag device with a gas for inflation and deployment, comprising;
    a cushion having a bag-shape and being stored as a rolled up or folded cushion in a longitudinally elongated stored form;
    the cushion has a plurality of chambers, and a duct positioned above the plurality of chambers to distribute the gas for inflation and deployment to the plurality of chambers,
    a first strap having a first end attached to the front pillar and a second end attached on a vehicle inner side to an outside surface of the rolled up or folded cushion in the longitudinally elongated stored form, and the second end of the first strap is attached above the duct; and
    the first strap moving to the vehicle inner side and being strained by inflation and deployment of the cushion thereby pushing out the front pillar trim that covers the front pillar to the vehicle inner side.

* * * * *